United States Patent [19]

Yoshie

[11] Patent Number: 4,805,458
[45] Date of Patent: Feb. 21, 1989

[54] ULTRASONIC IMAGING APPARATUS INCLUDING IMPEDANCE CONVERTER

[75] Inventor: Tsuyoshi Yoshie, Ootawara, Japan

[73] Assignee: Kabushiki Kaisha Toshiba, Kawasaki, Japan

[21] Appl. No.: 91,946

[22] Filed: Sep. 1, 1987

[30] Foreign Application Priority Data

Sep. 30, 1986 [JP] Japan .................. 61-229690

[51] Int. Cl.$^4$ ............................ G01N 29/00
[52] U.S. Cl. ........................ 73/602; 73/620
[58] Field of Search .......... 73/602, 620, 625, 626, 73/627, 628, 629; 128/660

[56] References Cited

U.S. PATENT DOCUMENTS 3,960,007 6/1976 Swensen .................. 73/629
4,671,115 7/1987 Yoshie .................... 73/626

FOREIGN PATENT DOCUMENTS

3423015A1 6/1984 Fed. Rep. of Germany .
62-112537 5/1987 Japan .

Primary Examiner—Michael J. Tokar
Assistant Examiner—Robert P. Bell
Attorney, Agent, or Firm—Finnegan, Henderson, Farabow, Garrett & Dunner

[57] ABSTRACT

An ultrasonic imaging apparatus includes a transducer probe having a plurality of transducer elements, an impedance converter provided in the transducer probe, a signal processor, and a signal cable connected between the signal processor and the transducer elements via the impedance converter. The impedance converter is a transistor emitter follower having an emitter resistor. The emitter resistor is not provided within the probe, but connected between the output terminal of the signal cable and the input terminal of the signal processor.

5 Claims, 3 Drawing Sheets

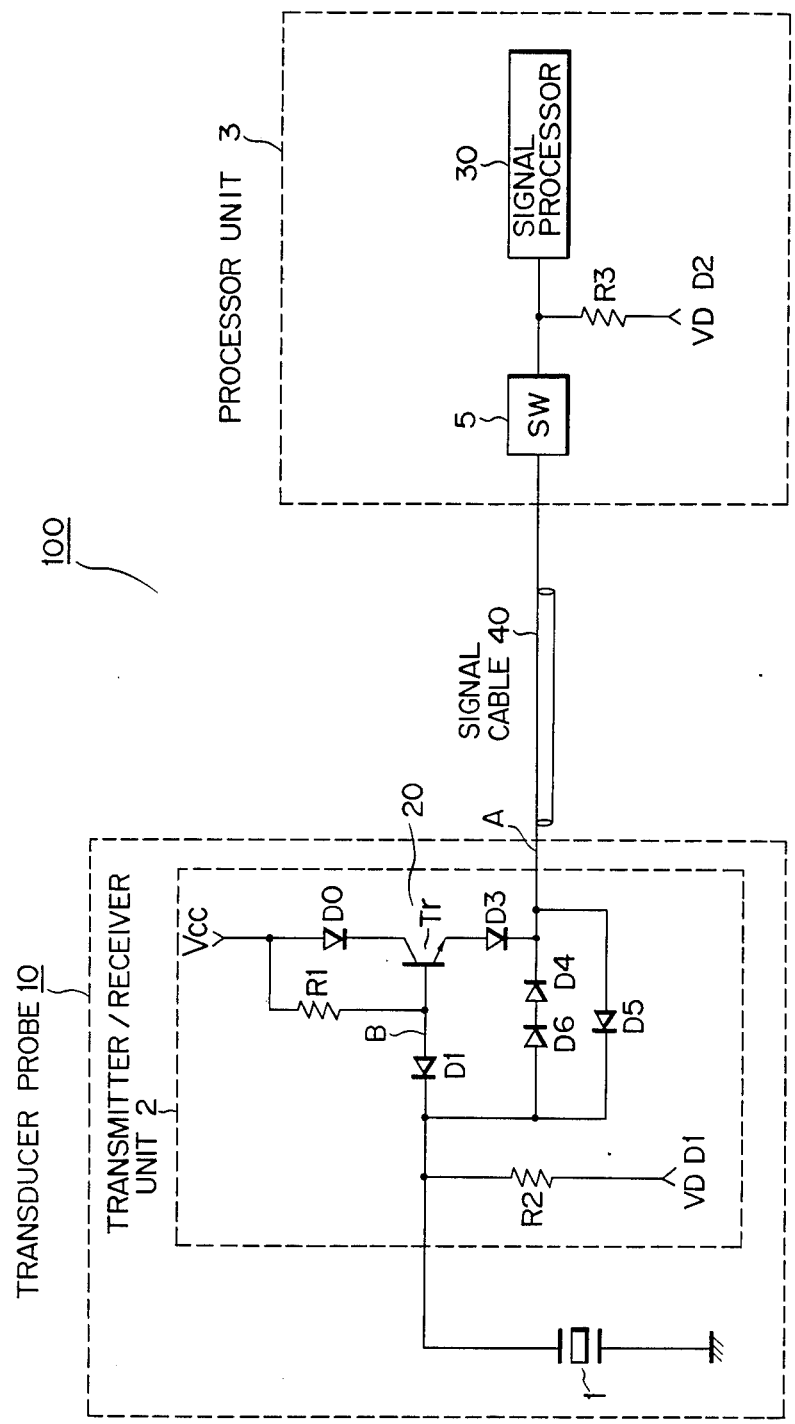
F I G. 2

ULTRASONIC IMAGING APPARATUS INCLUDING IMPEDANCE CONVERTER

BACKGROUND OF THE INVENTION

1. Field of the Invention

The present invention generally relates to an ultrasonic imaging apparatus including a transducer probe and, more particularly, to an impedance converter having higher input/lower output impedance characteristics provided in the transducer probe.

2. Description of Related Art

In an ultrasonic imaging apparatus, an ultrasonic probe having large quantities of transducer elements to transmit and receive ultrasonic beams/echoes is connected via a signal cable to a processor unit which generates a transmission signal (also referred to as a drive pulse or exciting pulse) which is applied to the transducer elements of the ultrasonic probe and to process the reception signal (reception echo) from the transducer elements.

When such an ultrasonic imaging apparatus is in the receiving mode, the transducer elements function to receive the reflected ultrasonic echoes and convert them into electronic echo signals. Therefore, this transducer element can be regarded as a kind of signal source when it is viewed with regard to the major portion of the imaging apparatus. According to the general rule in a signal transmission path, it is better that an output impedance from the signal source is as low as possible in view of signal loss. However, an output impedance of the transducer element is relatively high, for example, 400 ohms. Therefore, the signal transmission is adversely influenced by a stray capacitance which is typically 110 pF/m on the signal transmission path, mainly in the cable. Consequently, there is a tendency such that a loss of reception signal is large and thus, the S/N (signal to noise) ratio deteriorates. A deterioration in S/N ratio causes an image quality of a displayed ultrasonic image to be deteriorated. To eliminate such a drawback, it has conventionally been desired to essentially solve the deterioration in the S/N ratio.

It is therefore an object of the present invention to provide an ultrasonic imaging apparatus which can supply echo signals having a better S/N ratio to the processor unit even if a transducer probe having a high output impedance characteristic is employed.

SUMMARY OF THE INVENTION

The object of the invention is accomplished by providing an ultrasonic imaging apparatus comprising a transducer probe including a plurality of transducer elements for transmitting ultrasonic beams toward an object under examination, and for receiving said beams reflected therefrom to derive echo signals, a signal processor for processing the echo signals derived from the transducer probe, an echo-signal transmission cable connected between the transducer probe and the signal processor for transferring the echo signals from the transducer probe to the signal processor via the echo-signal transmission cable, and an emitter follower having an emitter resistor and provided within the transducer probe except for the emitter resistor, for converting a high input impedance into a low output impedance, thereby outputting low impedance echo signals to the signal processor via the echo-signal transmission cable, the emitter resistor being interposed between the echo-signal transmission cable and the signal processor.

BRIEF DESCRIPTION OF THE DRAWINGS

These and other features and advantages of the present invention will become more apparent from the following detailed description of an exemplary embodiment thereof, as illustrated in the accompanying drawings, in which:

FIG. 2 is a schematic block diagram of the imaging apparatus according to one preferred embodiment of the invention.

DETAILED DESCRIPTION OF THE PREFERRED EMBODIMENTS

Basic Idea

The present invention is accomplished based upon the following recognition.

Figure 1:
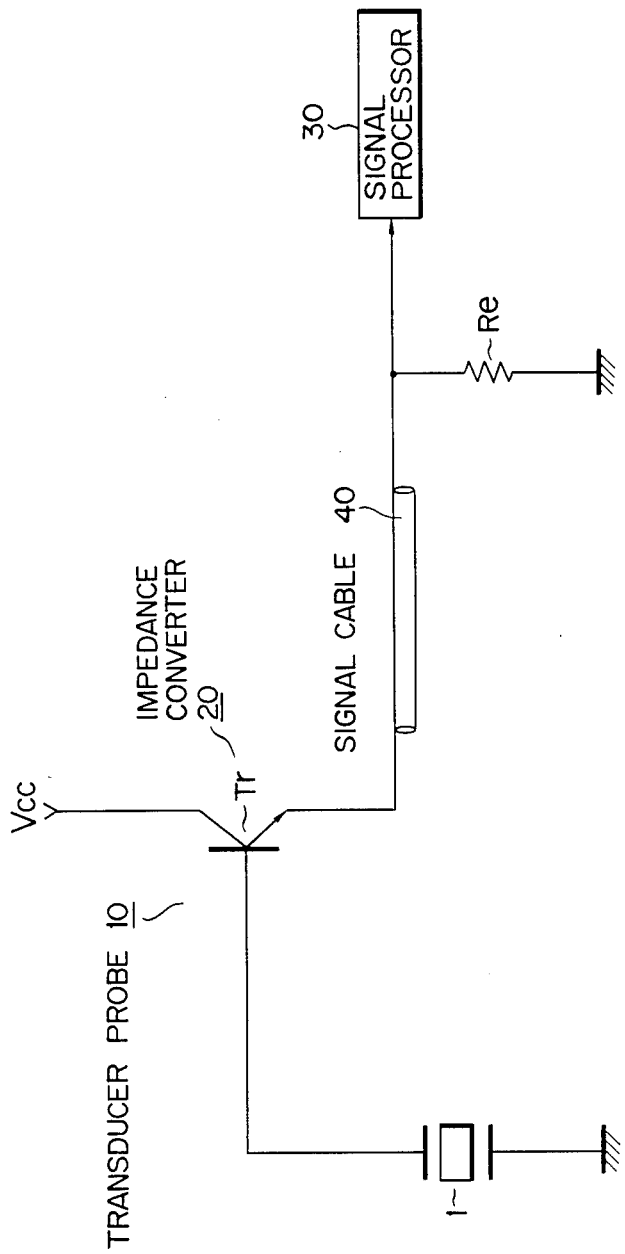
FIG. 1 is a schematic block diagram for illustrating a basic idea of an ultrasonic imaging apparatus according to the invention.

FIG. 1 is a block diagram showing the principle of the invention. This ultrasonic imaging circuit includes: a transducer probe 10; a high input/low output impedance converter 20, a part of which is included in transducer probe 10; a signal cable 40 to transmit an output (echo signals) of impedance converter 20; and a signal processor 30 connected to the signal cable 40 for properly processing echo signals received through signal cable 40 from the transducer probe 10.

Since FIG. 1 is simply illustrated only for easy understanding of the operating principle, the simplicity is made as follows.

First, a transducer probe can include, for example, 96 or 128 transducer elements. Only one transducer element 1 is provided in transducer probe 10. Further, according to the invention, the circuit portion of emitter follower 20 excluding emitter resistor Re to convert an impedance of received echo signal is included in transducer probe 10.

As previously described, an output impedance of transducer element 1 is a high output impedance of, for example, about 400 ohms. A low input impedance of signal processor 30 is, for instance, about 200 ohms.

The echoes received by transducer element 1 are converted into echo signals and supplied to the base electrode of transistor Tr of emitter follower 20. Thus, the circuit impedance is converted from a high input impedance to a low output impedance due to the function of emitter follower (collector being grounded) 20. The impedance-converted echo signals are supplied to signal processor 30 of a low input impedance through signal cable 40. Signal cable 40 has a parasitic capacitance of typically 110 pF/m. Therefore, when the echo signal is directly transmitted from a signal source of a high input impedance (i.e., from transducer element 1) to the signal processor 30, the echo signals, particularly high frequency echo signals, are significantly lost.

Therefore, the present invention has considered an effective countermeasure for such a drawback in consideration of the above-described signal loss characteristics due to the higher impedance.

On the other hand, emitter resistor Re of emitter follower 20 radiates a large heat due to a relatively large current flowing through emitter resistor Re on the basis of the Ohm's law. Since this heat radiation causes medical problems, emitter resistor Re is disposed on the input side of signal processor 30 on the output side of cable 40. In other words, this feature can be also rewritten such that emitter resistor Re, which produces a heat, is employed in the ultrasonic imaging apparatus other than probe 10 and signal cable 40. According to the Japanese Industrial Standard, or the international IEC, the temperature of the transducer probe is limited to 41°–42° C. so as to avoid burning a patient.

A transmission signal system such as a pulser and the like is omitted for simplicity of explanation.

CIRCUIT ARRANGEMENT OF IMAGING APPARATUS INCLUDING EMITTER FOLLOWER

A first ultrasonic imaging apparatus 100 using the operating principle according to the invention as mentioned above will now be described with reference to FIG. 2.

The same or similar circuit components as those in FIG. 1 are designated by the same reference numerals. Similarly, only a single transducer element 1 of transducer probe 10 is shown and it is assumed that only a single signal processing channel is provided in correspondence to one transducer element 1.

Ultrasonic imaging apparatus 100 according to a first preferred embodiment includes transducer element 1 of ultrasonic probe 10, transmitter/receiver section 2 employed in probe 10 and including emitter follower 20, processor unit 3, signal cable 40, high-withstanding voltage switch 5, and signal processor 30.

As mentioned above, ultrasonic probe 10 includes a plurality of transducer elements 1 which are arranged in an array. Only one of transducer elements 1 is shown in FIG. 2.

Transmitter/receiver section 2 is provided in correspondence to transducer element 1 in ultrasonic probe 10. Transmitter/receiver section 2 allows a transmission signal (drive pulse) for use in the excitation of transducer element 1 to pass at a low loss, receives the reception signal from transducer element 1 representing a high impedance, and outputs the received reception signal representing a low impedance. In general, to realize such functions, various kinds of circuit arrangements may be conceived. In the preferred embodiment, the emitter follower is constituted by mainly a bipolar transistor Tr whose collector is grounded. Namely, the reception signal (echo signal) from transducer element 1 is transmitted to the base of transistor Tr through diode $D_1$. An emitter output of transistor Tr is transmitted to processor unit 3 through diode $D_3$ and signal cable 40. Resistors $R_1$ and $R_2$ are provided to determine a potential at point B. Diode $D_1$ is forwardly biased and turned ON by a current flowing through resistors $R_1$ and $R_2$. Diodes $D_4$ and $D_6$ and diode $D_5$, which are connected in parallel, are arranged between the cathodes of diodes $D_1$ and $D_3$. On the other hand, the transmission signal supplied from processor unit 3 is applied to transducer element 1 through diode $D_5$. Diodes $D_4$ and $D_6$ are provided to immediately discharge the charges stored in the capacitive component of transducer element 1.

High-withstanding voltage switch 5 selectively connects the transducer element with signal processor 30 of processor unit 3 in order to sequentially, electronically shift and drive transducer element 1 in what is called electronic linear scanning. In order to allow an emitter current in the receiving mode of transmitter/receiver section 2 to flow, emitter resistor $R_3$ is arranged between the input of signal processor 30 and switch 5 in processor unit 3. Therefore, when the transducer element shown in FIG. 2 functions as transducer element 1 to perform the ultrasonic beam transmitting/receiving operations, switch 5 is turned on and transmitter/receiver unit 2 operates as transmission/reception signal transmitting means. However, when transducer element 1 functions as a transducer element which does not transmit/receive the ultrasonic beams, switch 5 is turned off, so that unit 2 does not operate as transmission/reception signal transmitting means. In this case, since the emitter current of emitter follower 20 of the reception signal path of unit 2 does not flow, the electric power consumption of unit 2 is very low. As described above, the feature is such that the average electric power consumption of all of the transducer elements is reduced.

In general, the emitter current is determined by the value of resistor $R_3$, the value of $V_{DD2}$, and the value of the potential at point A. However, when the current value is small, the electric power consumption of emitter follower 20 decreases, but accordingly, the amplitude of a signal passing through emitter follower 20 is limited. The reduced component of the average electric power consumption by the switching operation of switch 5 can be allocated to an increase in emitter current, thereby also reducing a limitation to the amplitude of signal flowing through emitter follower 20.

On the other hand, processor unit 3 includes: a transmitter to generate a transmission signal; a receiver to receive a reception signal; a signal processor to process the received reception signal; a display device to display the result of the process; and the like. Since the arrangement of the processor unit is similar to that of a conventional unit, the detailed description thereof is omitted.

ULTRASONIC BEAM TRANSMISSION

Referring to FIG. 2, the ultrasonic beam transmission of the imaging apparatus 100 will now be described.

A drive pulse generated from a transmitter, i.e., pulser (not shown in detail) of processor unit 3 is transmitted to transmitter/receiver unit 2 through switch 5 and cable 40. The transmitted drive pulse passes through diode $D_5$ for allowing a transmission signal to pass therethrough. This drive pulse is applied to transducer element 1, so that an ultrasonic beam is generated from transducer element 1. The drive pulse voltage is generally set to a high voltage of about tens of volts to one hundred volts but less than 200 volts. Voltages of $V_{CC}$, $V_{DD1}$, and $V_{DD2}$ are set to low voltages of about a few volts. Therefore, in the transmission mode, diodes $D_1$ and $D_3$ are being reversely biased by the drive pulse and turned off. Thus, a drive pulse is not applied between the base and emitter of transistor Tr, thereby preventing a breakdown of transistor Tr. Because of this feature, diodes $D_1$ and $D_3$ are called protecting diodes.

Since the drive pulse forwardly passes through diode $D_5$ and is applied to transducer element 1 in the transmission mode, the loss of drive pulse (transmission signal) in the signal channel is extremely small.

ECHO SIGNAL RECEPTION

The reflected beams of the ultrasonic beams generated from transducer element 1 are again received by transducer element 1. The reception signals (received echoes) are supplied to transmitter/receiver unit 2. For the time instance when no drive pulse is applied to transducer element 1, the bias state is established by $V_{CC}$, $V_{DD1}$, and $V_{DD2}$, so that diodes $D_4$, $D_6$, and $D_5$ are turned off. On the other hand, diode $D_1$ is forwardly biased and turned on by a current flowing through resistors $R_1$ and $R_2$. Diode $D_3$ is forwardly biased and turned on by an emitter current of transistor Tr. Thus, transistor Tr functions as an emitter follower and the emitter current changes depending upon the received echo signals. It is a significant feature of emitter follower 20 (whose collector is grounded) that an input impedance is high (ten of kiloohms or more) and an output impedance is low (a few ohms to tens of ohms) as is well known. Although the voltage gain is almost 1, the current gain is large and the signals between the base and emitter are in-phase. A change in emitter current is converted into a change in voltage by resistor $R_3$. The received echo signal output at a low impedance is supplied to signal processor 30 in processor unit 3 from the emitter follower. Although there is a case where an ultrasonic image of an object to be examined is formed as a signal process, there is also a case of performing an arithmetic operating process to discriminate a tissue of an object to be examined.

Since the reception signal is transferred at a low impedance in the foregoing receiving operation, the signal transmission is prevented from being adversely influenced by the stray capacitance of cable 40 and the relevant circuit and thus, a signal loss during the signal transmission is very small. Thus, there is a feature such that the S/N ratio is improved as compared with a conventional ultrasonic imaging apparatus to transmit a reception signal at a high impedance to the signal processing stage. The S/N ratio is particularly improved when the transducer probe having the higher operating frequency is employed.

IMAGING APPARATUS OPERATED IN SECOND MODE

Figure 3:
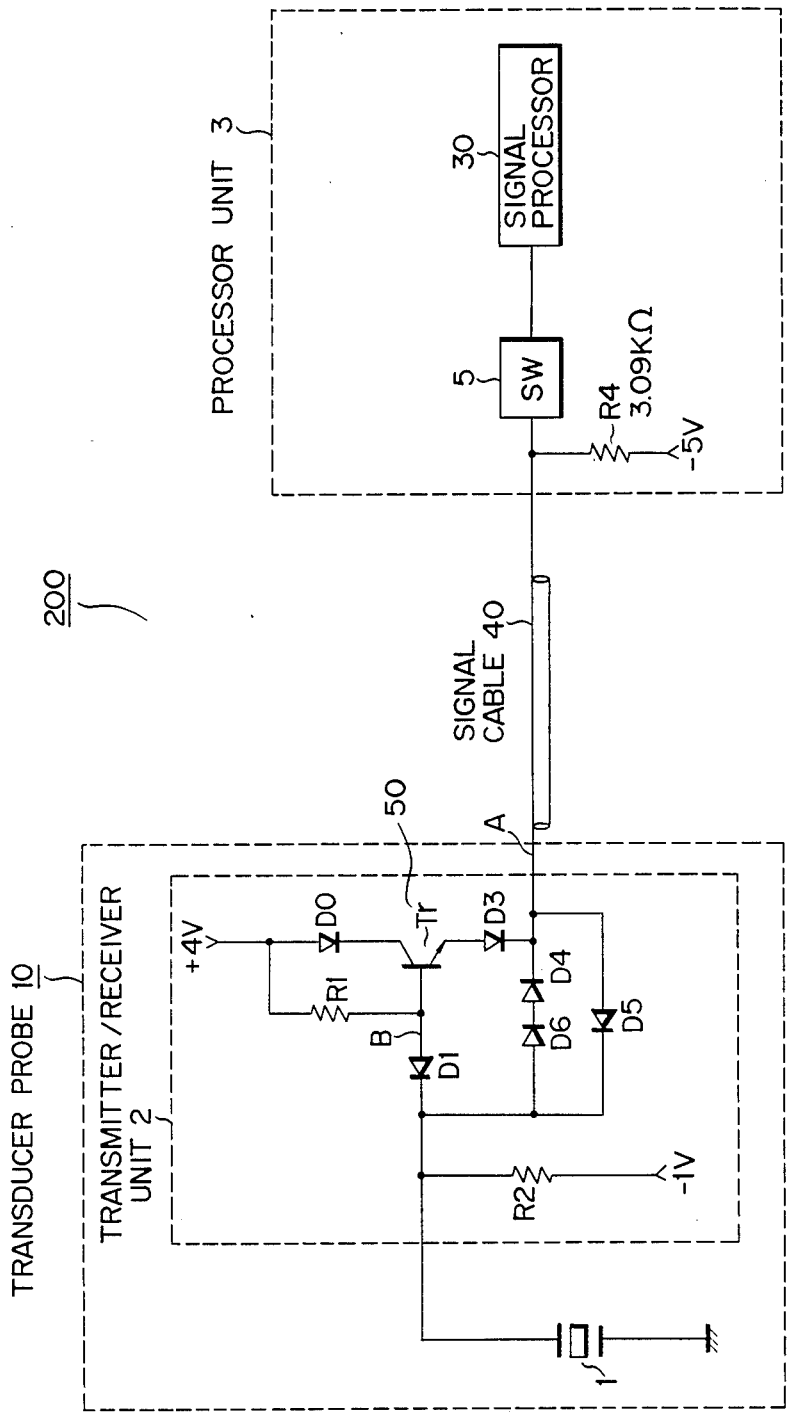
FIG. 3 is a schematic block diagram of the imaging apparatus according to the second embodiment of the invention.

Referring to FIG. 3, imaging apparatus 200 of the second embodiment of the invention will be described in detail.

Since the circuit arrangement of FIG. 3 is similar to the circuit arrangement of FIG. 2, the same or similar circuit components are designated by the same reference numerals and their descriptions are therefore omitted.

In FIG. 3, there is a feature such that emitter resistor $R_4$ of emitter follower 50 which is constituted by a bipolar transistor Tr is connected between high-withstanding voltage switch 5 and signal cable 40 in processor unit 3. In this circuit, emitter resistor $R_4$ is selected to be 3.09 k$\Omega$ and bleeder resistors $R_1$ and $R_2$ are selected to be 9.09 k$\Omega$ and 5.49 k$\Omega$. The voltages $+4$ V, $-1$ V, and $-5$ V shown in the diagram are applied to predetermined circuit points. When an operating frequency of transducer element 1 is set to, for instance, 3.75 MHz, the impedance measured from output point A of transmitter/receiver unit 2 to processor unit 3, namely, an output impedance of the impedance converter is about 200 $\Omega$.

In the actual circuit, a resistor of 50 $\Omega$ is inserted at the base of transistor Tr in order to prevent the occurrence of oscillation thereof.

As described above, according to the invention, it is possible to provide an ultrsonic imaging apparatus which can suppress heat generation in the ultrasonic probe and which can receive the echo signal with an improved S/N ratio by the processor unit.

The foregoing effects of the invention will be further described in detail.

First, the improvement in S/N ratio will be explained. Even if a center frequency of the transducer element is relatively low, for instance, 3.75 MHz, a band width of this element may be relatively wide. Therefore, the high frequency component of this low operation frequency can be sufficiently reproduced as compared with the case of a conventional apparatus, so that there is an effect such that the resolution of the resultant image is improved.

Next, in the transducer using the electronic sector scanning system, all of the elements are always excited and are always set in the reception mode. Therefore, the total amount of heat generation by emitter resistor $R_3$ of emitter follower 20 is extremely large because in the actual circuit, the transducer probe employs 96 or 128 transducer elements though only a single transducer element is shown in the diagrams. Thus, there is an effect such that the heat generation can be effectively diverged in processor unit 3. A serious adverse influence on the body to be examined, i.e., higher temperatures by such a large amount of heat can therefore be avoided.

The effects of the embodiment of FIG. 2 will be further described in detail hereinbelow.

First, it is a feature of the circuit of FIG. 2 that emitter resistor $R_3$ of emitter follower 20 of transducer probe 10 is connected on the output side of switch 5. Switch 5 functions to simultaneously select the transducer elements which transmit and receive ultrasonic beams from among all of the elements of transducer probe 10 and to connect the selected elements with signal processor 30. This implies that impedance converter 20 in the signal channels which were turned on by switch 5, are turned on and that impedance converter 20 in the signal channels which were turned off by switch 5, are turned off.

It is a final object of the invention to reduce an output impedance of impedance converter 20 to as low a level as possible. To this end an emitter current of impedance converter 20 is increased.

The higher the emitter current flowing through the emitter resistor, the greater the maximum amplitude of the signal which passes through impedance converter 20 without distortion.

However, an increase in emitter current results in an increase in the amount of heat generated by the emitter resistor. Assuming that an amount of heat generation per channel of impedance converter 20 is q[w] and the number of impedance converters which are simultaneously turned on is "n", a total amount of heat generation Q becomes $$Q = q[w]n \qquad (1)$$

As is well known, the total amount of heat generation Q is limited by the allowable maximum heat generation amount. Therefore, by the arangement as shown in the embodiment of FIG. 2, a value of q[w] can be set to a large value. Namely, since the emitter current can be increased, there is an advantage that an output impedance of impedance converter 20 can be set to a high value, and its practical use is enhanced.

Since emitter resistor R₃ is connected on the output side of switch 5, there is also an effect such that the signal can be processed by fewer signal processing channels than the number of transducer elements 1 of transducer probe 10.

MODIFICATIONS

Although the embodiments of the invention have been described above, the invention is not limited to the foregoing embodiments. Various modifications are obviously possible.

For example, a length of signal transmission path which connects transducer element 1 with the input terminal of transmitter/receiver section 2 is desirably designed to be as short as possible, since an output impedance of transducer element 1 is high. On the other hand, to miniaturize the ultrasonic probe, transmitter/receiver section 2 can also be constituted as an IC (integrated circuit).

For example, although the case where a bipolar transistor was employed has been described in the foregoing embodiments, a field effect transistor (FET) or an operational amplifier may be also employed as the impedance converter. In the case of an FET, an emitter follower is replaced by a source follower.

What is claimed is:

1. An ultrasonic imaging apparatus comprising:
    transducer probe means including at least one transducer element for transmitting an ultrasonic beam toward an object under exmaination, and for receiving an echo of said beam and converting the echo into an echo signal;
    signal processing means for processing said echo signal derived from said transducer probe means;
    echo-signal transmission means connected between said transducer probe means and said signal processing means for transferring said echo signal from said transducer probe means to said signal processing means via said echo-signal transmission means; and
    emitter follower means having an emitter resistor and being provided within said transducer probe means except for said emitter resistor, for converting a high input impedance into a low output impedance, and for outputting said echo signal with the low output impedance to said signal processing means via said echo-signal transmission means, said emitter resistor being connected to the connection between said echo-signal transmission means and said signal processing means.

2. An apparatus as claimed in claim 1, further comprising:
    a high voltage withstanding switch connected between said echo-signal transmission means and said emitter resistor for selectively connecting said transducer probe means and said signal processing means to supply said echo signals to said signal processing means.

3. An apparatus as claimed in claim 1, further comprising:
    a high voltage withstanding switch connected between said emitter resistor and said signal processing means for selectively connecting said transducer probe means and said signal processing means to supply said echo signals to said signal processing means.

4. An apparatus as claimed in claim 2, further comprising:
    protection diodes connected to said emitter follower means for protecting said emitter follower means against high-voltage transmission pulses to be applied to said transducer elements.

5. An apparatus as claimed in claim 3, further comprising:
    protection diodes connected to said emitter follower means for protecting said emitter follower means against high-voltage transmission pulses to be applied to said transducer elements.

* * * * *